April 10, 1934.  C. TAPPAN  1,954,187
SOUND-ON-FILM REPRODUCING APPARATUS
Original Filed Jan. 22, 1932
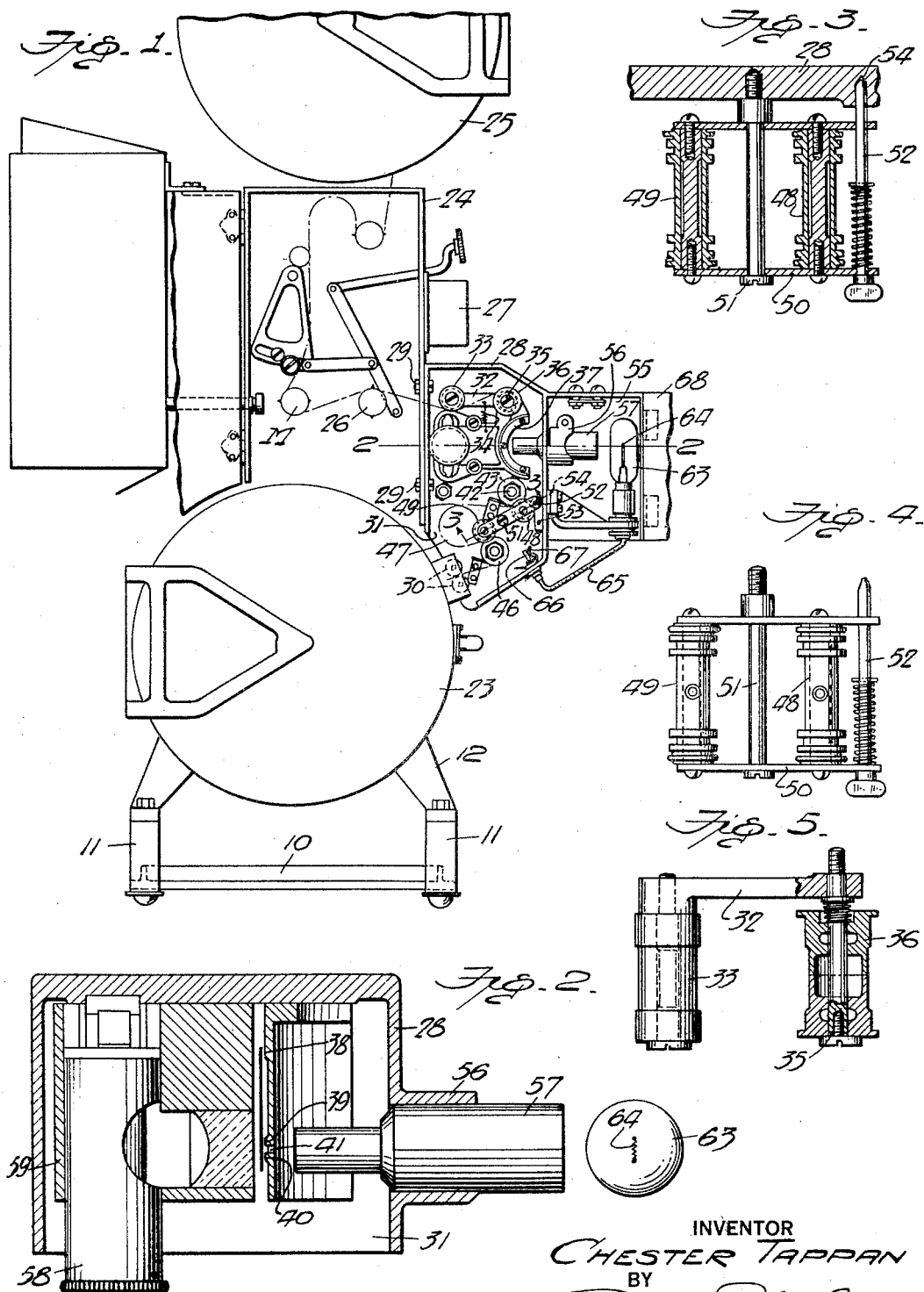
INVENTOR
CHESTER TAPPAN
BY
David Pelton Moore
ATTORNEY Patented Apr. 10, 1934

1,954,187

UNITED STATES PATENT OFFICE 1,954,187

SOUND-ON-FILM REPRODUCING APPARATUS

Chester Tappan, New York, N. Y., assignor to General Talking Pictures Corporation, New York, N. Y., a corporation of Delaware Original application January 22, 1932, Serial No. 588,188. Divided and this application July 20, 1932, Serial No. 623,590

3 Claims. (Cl. 179—100.3)

This application is a division of my application filed January 22, 1932, Serial No. 588,188.

The present invention relates to improvements in sound-on-film apparatus, and more particularly to a portable combined sound-on-film and motion picture projector, and in which novel features of construction are embodied to insure the proper intermittent movement in the projector and the constant speed movement in sound-on-film portion of the apparatus, thereby producing in apparatus which will reproduce a picture and sound in the most satisfactory manner.

Another object of this invention is the provision of novel mechanism for threading the film through the sound-on-film attachment in a rapid and thorough manner.

Still another object of this invention is the provision of a novel arrangement of film guide or slit block, an optical system and photo electric cell support, and in which the projection of the light through the optical system is from the rear of the film instead of from the front, as is the usual practice, thereby providing an exceedingly compact arrangement, and also permitting the film to be quickly and easily threaded and maintained in the necessary taut condition when passing the slit block.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing, Figure 1 is a side elevation of the complete apparatus, with the door of the projector mechanism and of the sound head open or removed to show the interior mechanism. Figure 2 is a section taken on line 2—2 of Figure 1. Figure 3 is a section taken on line 3—3 of Figure 1. Figure 4 is an enlarged detailed view of the film holding and releasing mechanism per se. Figure 5 is a detailed view of the idler and slit pulley.

Referring to the drawing, the numeral 10 designates a base plate or member having the upstanding apertured projections 11 to which are attached the main frame 12 of the mechanism. Carried by the frame 12 is a lower film magazine 23 and supported thereabove is a casing 24 which in turn supports an upper film magazine 25. The film F is normally fed from the upper magazine 25 through the casing 24 and into the lower magazine 23, the casing 24 being provided with the film progressing mechanism generally designated as M, but which includes primarily for the present arrangement the lower constant speed driven sprocket roller 26 which in turn is driven through gearing by the shaft 22. Removably attached at and to the front of the casing 24 and below the projection lens 27 is the sound-on-film attachment or casing 28, the bolts 29 of which being disposed in elongated slots (not shown) in the casing 24 so that the film may be properly introduced from the casing 24 to the casing 28 and between the rollers 30 of the magazine 23 in proper relation.

The sound-on-film attachment here shown consists of a main compartment 31 which has mounted therein a pivoted lever 32 carrying a film tensioning roller 33, this lever being held downwardly either by gravity or with a spring 34. The fulcrum pin 35 of the lever 32 in addition to supporting the said lever, also supports the two part roller 36 over which the film is passed as indicated, and below this split roller 36 is mounted an arcuate-in-cross section film guide or slit block 37, and the split roller 35 is so disposed that the film is set on to the convex outer surface of the slit block 37 between the ridges 38, 39 and 40 thereof, so that the sound track of the film registers between the space between the latter two ridges and over the slit 41. Disposed below the slit block is a shaft 42 which supports a toothed roller 43 around which the film is passed, and then driven from the roller 26 by means of a silent chain (not shown), this chain being also passed around a sprocket 45 to drive a toothed roller 46 within the chamber 31 and at the same speed as the roller 43. These rollers 43 and 46 are in spaced relation and the film is so fed therearound as to form a loop 47 and is held in such position by means of the rollers 48 and 49 respectively carried by the lever 50. This lever is pivoted intermediate of its ends as at 51 and is disposed to be moved in respective positions as shown in Figures 2 and 5, there being a vertically slidable knobbed pin 52 carried by said lever and disposed to be engaged in either opening 53 or 54 to hold the rollers out of engagement with the film or against the respective rollers 43 and 46 to press the film and hold it against such rollers or as illustrated in Figure 1.

It will thus be seen that in order to properly thread the film through the sound-on-film attachment, it is merely necessary to move the lever 51 to the position as shown in Figure 4 and elevate the roller 33 so that the film can be drawn around and over the split roller 35 across the guiding face of the slit block around the toothed roller 43 to form the loop 47 and around the toothed roller 46 between the guide rollers 30 into the lower magazine, the roller 33 having been previously released to fall by gravity and rest upon the film as shown in Figure 1 and the lever 51 being then moved from the position as shown in Figure 4 to that shown in Figure 1.

There is provided a second chamber 55 which has mounted in the cylindrical clamping member 56 an optical system 57 which is disposed so as to project its slit image through the slit 40 of the slit block and upon and through the sound track of the film, the photo electric cell (not shown) in the cartridge 58 being affected thereby in the usual manner. This cartridge is removably mounted in its holder 59 mounted in the chamber 31 and carries a photo cell of any type. Mounted within the compartment 55 is a bracket 60 which supports an adjustable socket 61 of the exciter lamp 63, said lamp when in position having its filament 64 disposed in proper alignment with the optical system, the slit of the slit block and the photo cell. In order that the exciter lamp may be quickly replaced when necessary, a cord 65 is attached to the centre contact thereof, and the same is threaded through the socket 61 from the lower portion of the casing 28 so that the contact terminal 66 thereof may be engaged with the electrically insulated contact clamp 67, through which the proper current is supplied to the filament of the exciter lamp. A door 68 is provided for the sound-on-film attachment, so that after the film has been threaded and the machine is ready for operation, the same can be closed and the light from the exciter lamp be more efficiently directed. Mounted upon the shaft 42 exteriorly of the attachment is a flywheel (not shown) which in conjunction with the idler 33 driven by the silent chain imparts to the film advancing mechanism of the sound-on-film attachment the desired steady or constant speed movement desirable in apparatus of this type where the sound-on-film is used in conjunction with the projection of moving pictures.

From the foregoing description, taken in connection with the drawing, it is evident that there is here provided a combined motion picture projector and sound reproducing mechanism that is exceedingly compact for portable use and by means of which the sound-on-film advancing mechanism and also the optical system and coordinated parts are placed in an easily accessible position and in very compact relation to and with the motion picture projector.

It is also noticeable that by means of the silent chain drive that the essential elements of the sound-on-film attachment are driven directly from and in co-ordination with the lower constant speed sprocket roller of the motion picture projector, so that the intermittent motion of the film progressing mechanism of the motion picture machine will have no deleterious effect upon the reproduction of sound as the film is moving through the sound-on-film attachment.

What is claimed is:

1. A sound-on-film attachment for motion picture projectors including a main casing, a semi-circular in cross section slit block mounted therein and having a convex film guiding and receiving face, a photo electric cell mounted in the casing and adjacent the convex side of the slit block, an optical system mounted in the opposite wall of the casing and having its projecting end adjacent the concaved surface of the slit block, and a film advancing means disposed within the casing above and below the slit block, and in which the film advancing mechanism includes superposed plain roller and sprocket roller and between which is disposed the slit block, a pivotally mounted roller, the axis of which is the split roller disposed to rest from above upon the film to iron out irregularities therein upon the entrance of the film to the sound-on-film attachment, a second toothed sprocket roller mounted in the casing above the first toothed sprocket roller and in spaced relation thereto, and manually operable means for holding the film upon the last two rollers and for providing a loop in the film therebetween.

2. A sound-on-film attachment for motion picture projectors including a main casing, a semi-circular in cross section slit block mounted therein and having a convex film guiding and receiving face, a photo electric cell mounted in the casing and adjacent the convex side of the slit block, an optical system mounted in the opposite wall of the casing and having its projecting end adjacent the concaved surface of the slit block, and a film advancing means disposed within the casing above and below the slit block, and including a film advancing means having two driven sprocket rollers in the lower portion thereof and disposed in spaced relation, and means for holding the film in contact with said roller and for maintaining a loop in said film between said rollers, including a pair of arms pivoted intermediate of their ends, two rollers carried by the said arms, one for engaging its respective sprocket roller, and co-operative locking means carried by the arms and the casing whereby the arms may be locked in either extreme position.

3. A sound-on-film attachment for motion picture projectors including a main casing, a semi-circular in cross section slit block mounted therein and having a convex film guiding and receiving face, a photo electric cell mounted in the casing and adjacent the convex side of the slit block, an optical system mounted in the opposite wall of the casing and having its projecting end adjacent the concaved surface of the slit block, and a film advancing means disposed within the casing above and below the slit block, and in which an additional casing is attached to the main casing, an exciter lamp mounted in the additional casing and disposed so that the film image thereof is in alignment with the optical system, and a slit block unit including a semi-circular in cross section metallic member, the convex surface of which is provided with three spaced ridges to provide a wide and a narrow depression, a portion of the metal forming the narrow depression being provided with an aperture therethrough.

CHESTER TAPPAN.